United States Patent [19]

Harshbarger

[11] Patent Number: 4,509,079
[45] Date of Patent: Apr. 2, 1985

[54] INTERLACE DETECTOR

[75] Inventor: John H. Harshbarger, Xenia, Ohio

[73] Assignee: Visual Information Institute, Inc., Xenia, Ohio

[21] Appl. No.: 464,687

[22] Filed: Feb. 7, 1983

[51] Int. Cl.³ .............................................. H04N 5/24
[52] U.S. Cl. .................................................. 358/165
[58] Field of Search ................... 358/10, 33, 139, 165; 315/384; 324/20 CR

[56] References Cited

U.S. PATENT DOCUMENTS

| | | | |
|---|---|---|---|
| 3,479,459 | 11/1969 | Scipione | 358/165 |
| 3,721,760 | 3/1973 | Klein | 358/165 |
| 4,081,835 | 3/1978 | Klein | 358/165 |
| 4,228,464 | 10/1980 | Duijkers | 358/165 |

Primary Examiner—Tommy P. Chin
Assistant Examiner—Michael D. Parker
Attorney, Agent, or Firm—Jeffers, Irish & Hoffman

[57] ABSTRACT

The application relates to an interlace detector for a raster beam control circuit, such as in a television or computer display. Under 1:1 interlace conditions, depending on the condition of the logic at the time that the 1:1 interlace is selected, an odd field condition may result wherein the first half of the top horizontal line and the second half of the bottom horizontal line are blanked. The interlace detector detects this situation by detecting coincidence between a horizontal blanking pulse and the vertical reset pulse, and delays the transmission of the vertical reset pulse to the vertical field counter for one-half of the horizontal line scan time. This, in turn, delays vertical blanking so that a full line of information appears in the upper and lower lines of the display. In the specific embodiment disclosed, a bistable circuit triggered by horizontal blanking pulses and the undelayed vertical reset pulse produces the delayed vertical reset pulse.

14 Claims, 3 Drawing Figures

INTERLACE DETECTOR

BACKGROUND OF THE INVENTION

The present invention relates to raster-type displays, such as televisions and computer displays, and more particularly to a system for detecting odd-field type blanking in 1:1 interlace conditions, and correcting the vertical blanking so that full lines of information appear at the top and bottom of the display.

In raster-type displays, the user may elect to select from a plurality of scan rates and interlace conditions, depending on the particular application. Most television systems are interlaced to avoid a visible flicker in the display, usually in a 2:1 ratio. Thus, the 2:1 interlace ratio means that two entire display fields must be developed to generate one frame, or complete image. For example, the most common rate of 525/60 means that there are 525 scanning lines per television frame with one field developed in 1/60 second. Normally, the interlace ratio is 2:1, that is, a frame will be composed of two fields so that each field comprises one-half the number of scanning lines per frame, in this example, 262.5.

Television operation in 1:1 interlace, or non-interlace as it is sometimes referred to, is becoming more prevalent, particularly in the area of computer displays. The change from 2:1 to 1:1 interlace is made by making the count of scan lines in two fields either an even or odd number. An undesirable feature of random switching between the two is that the first and last scan lines in the non-interlaced (1:1 interlace) field may be either whole or half, depending on the logic condition at the instant of selection. The instant that the switch change impacts on the logic determines which condition comes up, either the odd field or the even field. Even though the same field is repeated sequentially, it can be either odd or even, with the odd field having a half-line at the top and bottom of the display. This is considered an undesirable condition in 1:1 interlace, and must be corrected, if the condition occurs.

SUMMARY OF THE INVENTION

In accordance with the present invention, an interlace detector and correction circuit is provided, wherein the raster control system is interrogated and, if a half line exists at the top or bottom of the field, a correction is inserted to force the development of a full line at the top and bottom. The interlace detection system determines whether conditions are such that vertical blanking is initiated sometime during the portion of the horizontal line in question containing video information, and if this is the case, the control signal that initiates vertical blanking is delayed by a time sufficient to enable that full line of information to be completed. Of course, a correction at the bottom of the display to change it from a half line to full line will automatically result in a correction of the top line because the vertical blanking pulse is of a predetermined, uniform width.

In a preferred form of the invention, a vertical reset pulse is generated at a precise time and the trailing edge thereof initiates vertical blanking. A coincidence circuit detects coincidence between a horizontal blanking pulse and the vertical reset pulse, and if this occurs, then conditions are such that vertical blanking will begin before completion of the horizontal line, and a half line will appear at both the top and bottom of the display field. In the preferred embodiment, the vertical reset pulse is caused to have a width equal to exactly one-half of a scan line, and this pulse is delayed so that its trailing edge coincides with the leading edge of the next horizontal blanking pulse so that vertical blanking does not occur until after completion of the horizontal line.

One form of the invention is a system for controlling a raster beam capable of operating selectively in 1:1 or 2:1 field interlace comprising horizontal blanking means for causing blanking during horizontal retrace of the beam, and vertical blanking means for causing blanking of the beam during vertical retrace, the vertical blanking including means for generating a vertical blanking control pulse which initiates the onset of vertical blanking. An interlace correction circuit connected to the vertical blanking means detects the occurrence of vertical blanking during a normally unblanked horizontal scan of the beam and delays the vertical blanking control pulse to delay the vertical blanking until completion of the normally unblanked horizontal scan. In a preferred form of the invention, the occurrence of vertical blanking during a normally unblanked horizontal scan is detected by determining the relationship of the vertical reset pulse with respect to horizontal blanking. Other ways of detecting the occurrence of vertical blanking could also be used.

It is an object of the present invention to provide a circuit for detecting half line scans at the top and bottom of the field under 1:1 interlace conditions, and taking action to correct such half line scans.

It is a further object of the present invention to detect and correct an improper interlace condition which is simple in construction and easily incorporated into existing raster beam control circuitry.

A still further object of the present invention is to provide a system wherein the improper interlace condition is detected and corrected automatically without the necessity for intervention by the person using the equipment.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawing, wherein.

DETAILED DESCRIPTION

Figure 1:
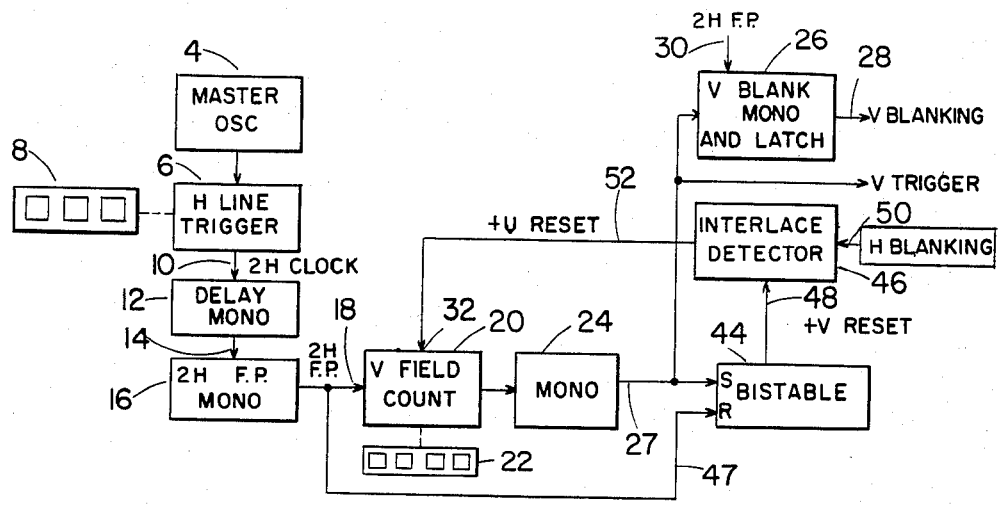
FIG. 1 is a block diagram of a portion of a raster beam control system including the interlace detector of the present invention.

Referring to FIG. 1, there is illustrated a portion of a control system for a raster beam, such as that used in a television, computer display terminal, monitor or the like. The circuitry for developing the various control signals in such systems are well known and, accordingly, only a portion thereof is illustrated to show in what manner the interlace detector of the present invention can be interfaced with a typical system.

Master oscillator 4 is connected to H line trigger 6 having selector switches, such as thumb wheel switches 8, connected thereto. Switches 8 are used to manually select a desired horizontal line time, and in the case of a selectable rate system, an H line trigger 6 counts the cycles of the alternating current signal generated by oscillator 4 in binary coded form and compares that binary coded count with the binary coded total line time selected by switches 8 to provide on its output 10 a train of clock pulses having twice the repetition rate (2H) of the line time selected. Of course, in a raster beam control system which is not of the selectable rate type, the H line trigger 6 would not be programmable. For example, many sync generators are of a single scan rate, such as the common 525/60 rate.

The 2H rate clock pulses on output 10 are delayed by monostable 12 to provide 2H delayed pulses on output 14 connected to the input of 2H front porch monostable 16. Monostable 16 provides horizontal front porch pulses at the 2H rate on the input 18 of V field counter 20, which may be programmable by switches 22 to select a desired scan rate. As in the case of H line trigger 6, however, if the sync generator or other raster beam control system is not of the selectable rate type, then counter 20 would not be programmable. The output of counter 20 is connected to monostable 24, and that output is connected to vertical blanking monostable and latch 26. The output 27 of monostable 24 is the vertical reset or vertical trigger pulse, and the trailing edge thereof triggers vertical blanking monostable and latch 26 to produce on output 28 the vertical blanking pulse. The width of the vertical blanking pulse on output 28 is controlled by vertical blanking monostable and latch 26 and the occurrence of the next 2H front porch signal on input 30 that occurs after the transition of the monostable to its original state. In any event, the width of the vertical blanking pulse is precisely controlled for each scan so that if the last line on the display is half blanked, than the first half of the top line will also be blanked. Correspondingly, if the vertical blanking is delayed by a half line, full lines of information will occur at the top and bottom of the display. As an alternative to utilizing a monostable and latch to select the vertical blanking width, a counter could be employed to count the number of horizontal scan lines for the duration of the vertical blanking pulse.

Figure 2:
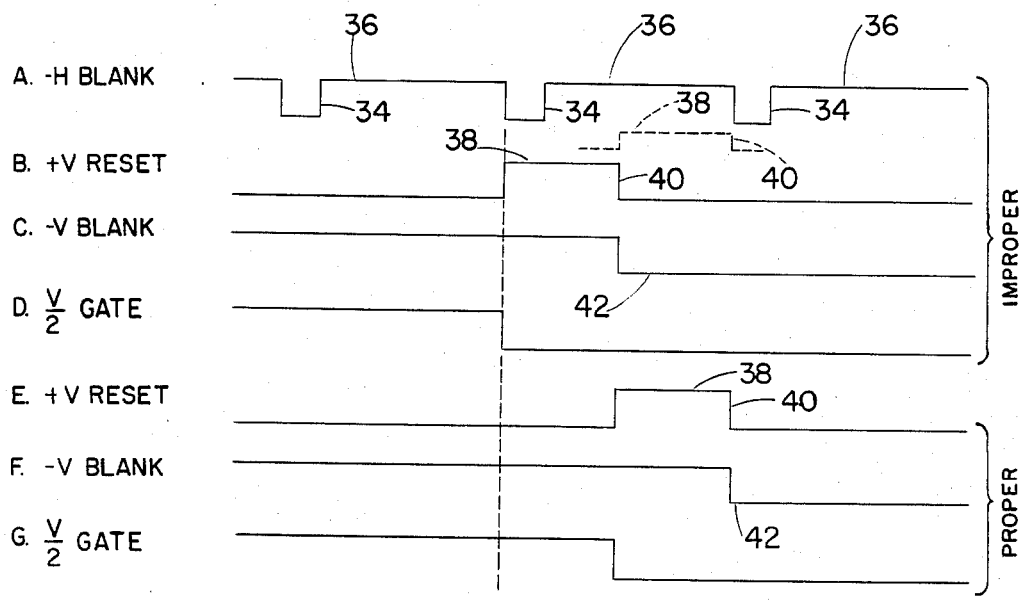
FIG. 2 is a timing diagram showing proper and improper vertical blanking under 1:1 interlace conditions.

Normally, the output 27 of monostable 24 would be connected to the reset input 32 of counter 20 to reset the counter 20 back to its original state for counting the interval preceding the occurrence of the next vertical reset pulse. Under 1:1 interlace conditions and depending on the state of the logic when the scan rate is selected or the system is activated, the half line blanking discussed above may occur. FIG. 2 illustrates what can occur in that case. The horizontal blanking pulses 34 cause horizontal blanking to occur for their entire intervals spaced by intervals 36 of display information. If the vertical reset pulse 38 occurs as shown in line D, the trailing edge 40 thereof will cause the vertical blanking pulse 42 to be generated such that vertical blanking is initiated at the middle of the horizontal line as defined by a single horizontal blanking pulse and the interval normally carrying the display information. Because the length of vertical blanking pulse 42 is so precisely controlled, then another half line of blanking will occur at the top of the next field of display.

In order to correct this problem, a bistable 44 and the interlace detector 46 of the present invention are connected in series between the output of monostable 24 and the reset input 32 of counter 20. Bistable 44 functions as a half line gate to insure that vertical reset pulse 40 is always one half horizontal line wide. Once bistable 44 is set by the leading edge of the vertical reset pulse on input 27, it remains in the set state until the next horizontal front porch occurring at the 2H rate arrives on input 46. Because the leading edge of the vertical reset pulse 38 occurs on the leading edge of the horizontal blanking pulse, by toggling bistable 44 with a horizontal front porch pulse at the 2H rate ensures that vertical reset pulse 38 will be exactly a half horizontal line wide.

The output 48 of bistable 44 is connected to the input of interlace detector 47, which is also fed with horizontal blanking pulses 34 on input 50. The output 52 of interlace detector 46, which carries the delayed vertical reset pulse, is connected to reset input 32 of counter 20.

As can be seen from the dotted line representation of vertical reset pulse 38 (FIG. 2), if it is delayed by a half horizontal line, then its trailing edge 40 will coincide with the leading edge of the next horizontal blanking pulse 24, which is the proper relationship as indicated in line E of FIG. 2. Since the trailing edge 40 of this pulse 38 is what initiates vertical blanking, then vertical blanking will occur at the onset of the next horizontal blanking pulse 34 thereby producing a full line of information at both the top and bottom of the display.

Figure 3:
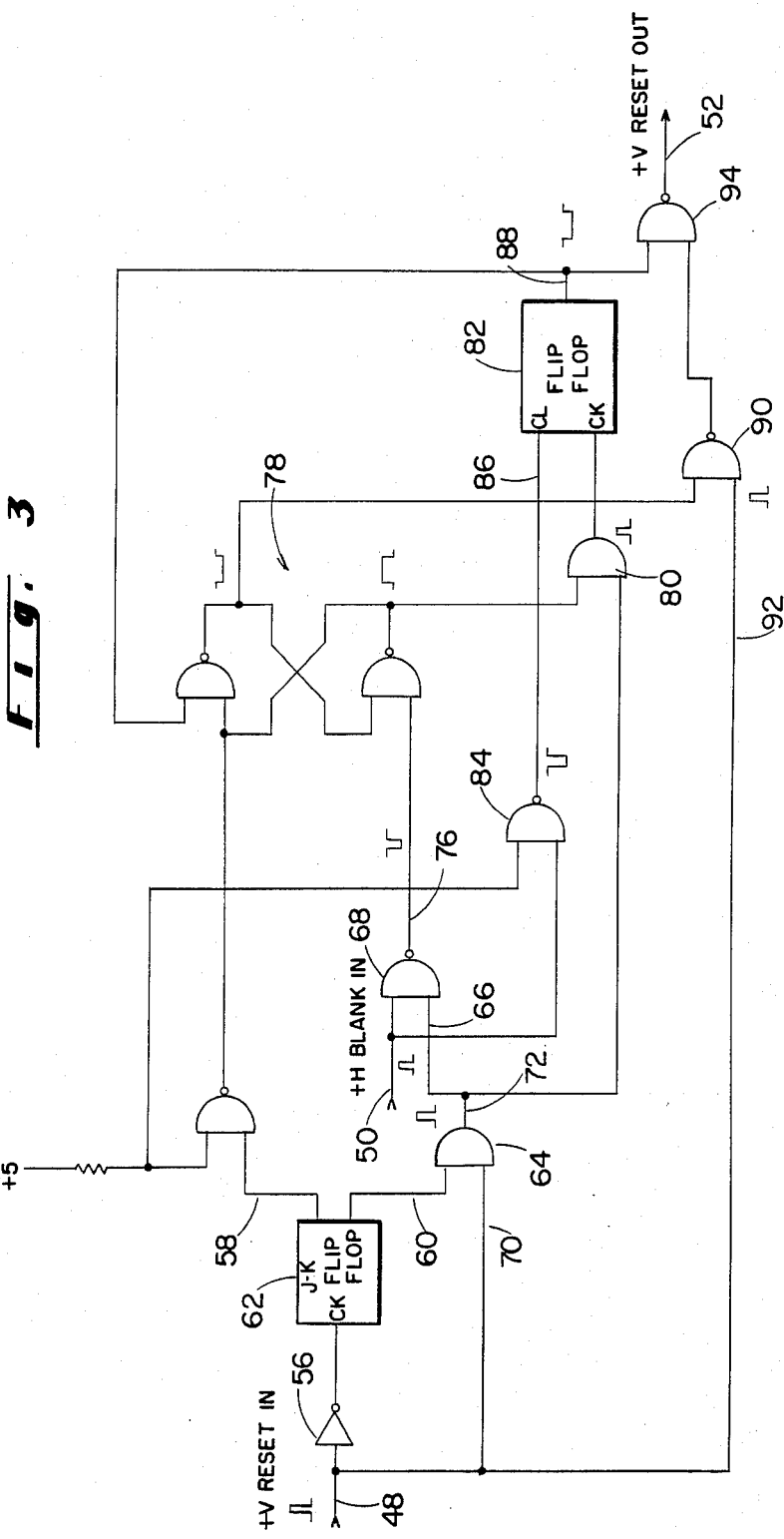
FIG. 3 is a detailed circuit schematic showing the interlace detector of FIG. 1.

Referring now to FIG. 3, interlace detector and correction circuit 46 is illustrated in detail. Interlaced or not, every other field should have a full line at the start of the active raster. Therefore, the vertical reset pulses on input 48, which are inverted by inverter 56, are connected to the clocking input of J-K flip flop 62 through inverter 56, so that output 60 carries a V/2 gating signal as shown in lines D and G in FIG. 2. AND gate 64 has one of its inputs connected to the V/2 gating signal and the other input 70 connected to the vertical reset signal, and functions to select alternate vertical reset pulses and place them on output 72 connected to one of the inputs 66 of NAND gate 68. JK flip-flop 62 and AND gate 64 function to allow every other vertical reset pulse to pass through thereby determining which field will be checked for the full line condition.

NAND gate 68 has its other input 50 connected to a source of horizontal blanking pulses, and if coincidence between a horizontal blanking pulse and vertical reset pulse occurs, then one horizontal blanking pulse is transmitted through gate 68 to output 76 to the Set input of bistable 78. A pulse passing through NAND gate 68 causes bistable 78 to change state thereby allowing the V reset pulse to pass through AND gate 80 and toggle JK flip-flop 82 on the trailing edge of the vertical reset pulse. Flip-flop 82 is returned to its original state by the next occurring horizontal blanking pulse passed by NAND gate 84 to the clear input 86, and the leading edge of the pulse on the output 88 of flip-flop 82 resets bistable 78. Bistable action causes gate 90 to close, thereby preventing the vertical reset pulse on its input 92 from being transmitted to NAND gate 94 if conditions are not correct. Because the trailing edge of the vertical reset pulse clocks flip-flop 82, the leading edge of the pulse on the output 88 will be coincident with the trailing edge of the input, and since the vertical reset pulse is constrained to be exactly one horizontal line wide, the circuit effectively delays the vertical reset pulse by one half of a horizontal line. NAND gate 94 inverts this pulse to produce a positive going vertical reset pulse on output 52.

The action of the circuit shown in FIG. 3 causes vertical reset pulse 38 to be delayed so as to appear as indicated in line E in FIG. 2 thereby initiating the onset of vertical blanking at the same time as the leading edge of the next occurring horizontal blanking pulse 34. This will produce a full line of information at both the top and bottom of the field.

Although a specific embodiment has been illustrated, there are other circuits which would also accomplish the same result. The elements which are important to the operation of the circuit are the means whereby detection of improper blanking can be made, and then automatic connection of this condition. Once the correction has been made, the vertical blanking will continue to remain in proper synchronization as long as a further scan rate is not selected.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A system for controlling a raster beam capable of operating selectively in 1:1 or 2:1 field interlace comprising: horizontal blanking means for causing blanking during horizontal retrace of the beam, vertical blanking means for causing blanking of the beam during vertical retrace, said vertical blanking means including means for generating a vertical blanking control pulse which initiates the onset of vertical blanking, and an interlace correction circuit connected to said vertical blanking means for detecting the occurrence of vertical blanking during a normally unblanked horizontal scan of the beam and delaying the vertical blanking control pulse to delay vertical blanking until completion of said normally unblanked horizontal scan.

2. The system of claim 1 wherein said vertical blanking control pulse is a vertical reset pulse produced by a vertical field counter clocked at a whole number multiple of the horizontal scan rate of the beam.

3. The system of claim 2 including means for connecting said vertical reset pulse passed or delayed by said interlace circuit to a reset input of said counter.

4. The system of claim 2 including pulse width adjustment means interposed between said counter and said interlace correction circuit for adjusting the width of said reset pulse connected to said interlace correction circuit to be equal to one half the length of a horizontal scan line, wherein the length of a horizontal scan line is equal to the blanked and unblanked time of one horizontal scan cycle.

5. The system of claim 4 wherein said pulse width adjustment means is a bistable circuit triggered by said reset pulse and by a pulse train occurring at the horizontal scan rate.

6. The system of claim 5 wherein said pulse train is a train of horizontal front porch pulses.

7. The system of claim 2 wherein said interlace correction circuit comprises an input connected to a source of horizontal blanking pulses produced by said horizontal blanking means, means for detecting the coincidence of a vertical reset pulse with a horizontal blanking pulse, and means selectively for delaying the vertical reset pulse if such coincidence occurs and passing through the vertical reset pulse if said coincidence does not occur.

8. The system of claim 7 wherein said interlace correction circuit comprises a bistable pulse producing circuit, operative when said coincidence occurs, set by the leading edge of said reset pulse and reset by the trailing edge of the horizontal blanking pulse next occurring after the trailing edge of said reset pulse.

9. The system of claim 8 including pulse width adjustment means connected to said interlace correction circuit for adjusting the width of the reset pulses to be one half the length of a horizontal scan line, wherein the horizontal scan line is equal to the blanked and unblanked time of one horizontal scan cycle.

10. A system for controlling a raster beam capable of operating selectively in 1:1 or 2:1 field interlace comprising:
means for developing a plurality of horizontal rate control pulses,
horizontal blanking means running at the horizontal rate for causing blanking during horizontal retrace of the beam,
vertical blanking means for causing blanking of the beam during vertical retrace, said vertical blanking means including counter means driven by the horizontal control pulses for producing on its output a vertical reset pulse to initiate vertical blanking when a predetermined number of the horizontal control pulses have been counted,
said counter means having a reset input and means for resetting said counter when a pulse appears thereon, and
an interlace correction circuit connected between the output of said counter means and the reset input and connected to the horizontal blanking pulses for passing the vertical reset pulses to said counter means reset input, said interlace correction circuit including means for detecting the occurrence of vertical blanking during a normally unblanked horizontal scan of the beam and delaying passing the vertical reset pulse to the reset input for a time to delay vertical blanking until completion of said normally unblanked horizontal scan.

11. The system of claim 10 including pulse width adjustment means interposed between said counter means and said interlace correction circuit for adjusting the width of the reset pulse connected to said interlace correction circuit to be equal to one half the length of a horizontal scan line, wherein the length of a horizontal scan line is equal to the blanked and unblanked time of one horizontal scan cycle.

12. The system of claim 11 wherein said pulse width adjustment means is a bistable circuit triggered by said reset pulse and by said horizontal rate control pulses.

13. The system of claim 12 wherein said horizontal rate control pulses are H rate front porch pulses.

14. A system for controlling a raster beam capable of operating selectively in 1:1 or 2:1 field interlace comprising:
means for developing a plurality of horizontal rate control pulses,
horizontal blanking means running at the horizontal rate for causing blanking during horizontal retrace of the beam,
vertical blanking means for causing blanking of the beam during vertical retrace of the beam, said vertical blanking means including counter means driven by the horizontal control pulses for producing on its output a vertical reset pulse to initiate vertical blanking when a predetermined number of the horizontal control pulses have been counted, said counter means having a reset input and means for resetting said counter when a pulse appears thereon, and an interlace correction circuit connected between the output of said counter means and the reset input and connected to horizontal blanking pulses produced by said horizontal blanking means for detecting the coincidence of a horizontal blanking pulse and vertical reset pulse and, if coincidence occurs, delaying the passing of the vertical reset pulse to the reset input of said counter for a time to delay vertical blanking until the next occurring horizontal blanking pulse.

* * * * *